June 15, 1948.  G. WEGGUM  2,443,546
TRUCK HOIST CAR
Filed April 16, 1945  2 Sheets-Sheet 1
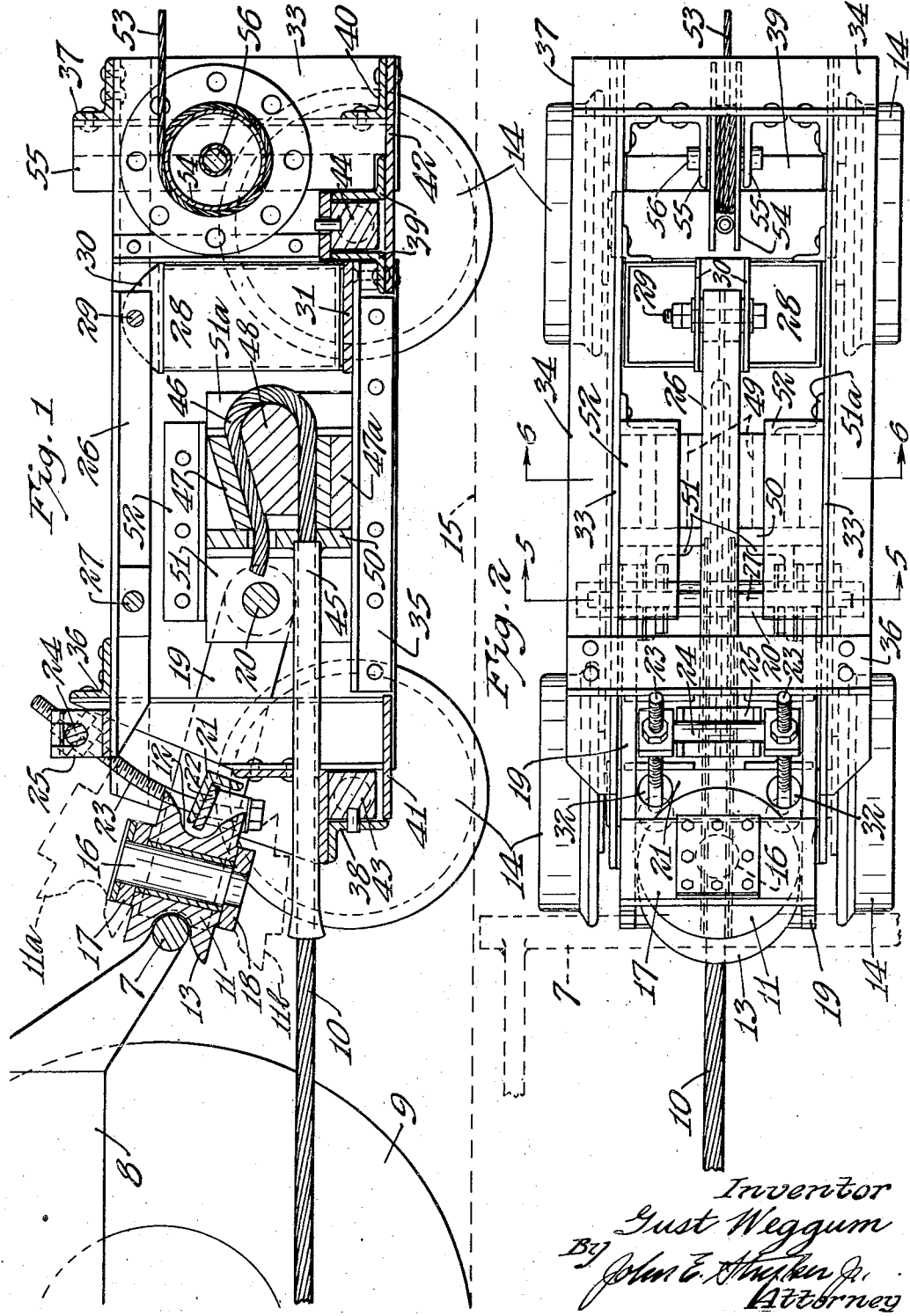
Inventor
Gust Weggum
By John E. Hupken Jr.
Attorney June 15, 1948.  G. WEGGUM  2,443,546
TRUCK HOIST CAR
Filed April 16, 1945  2 Sheets-Sheet 2
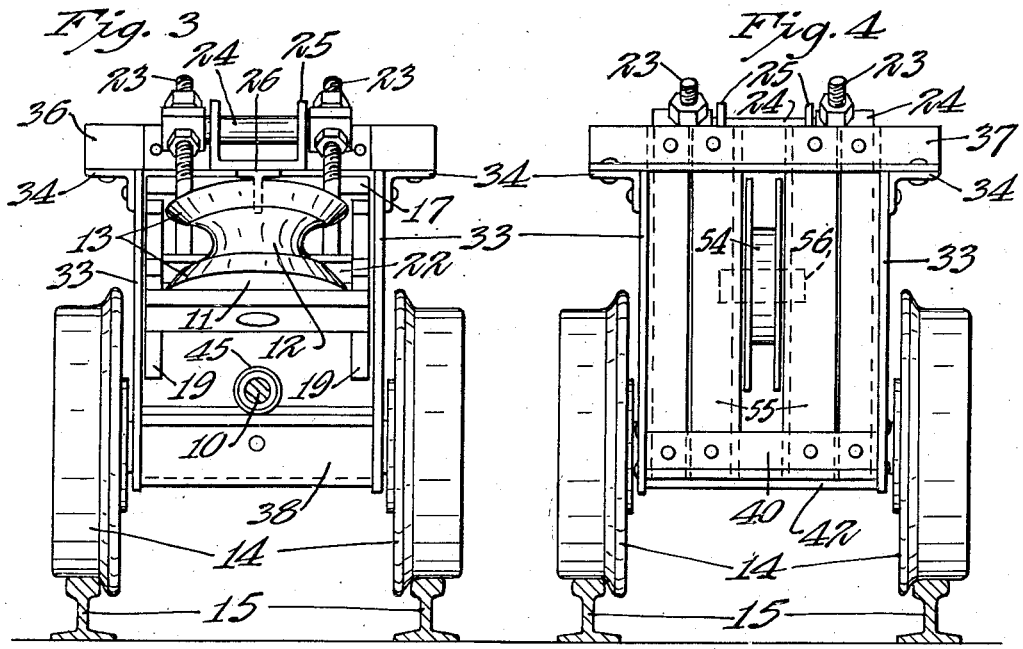
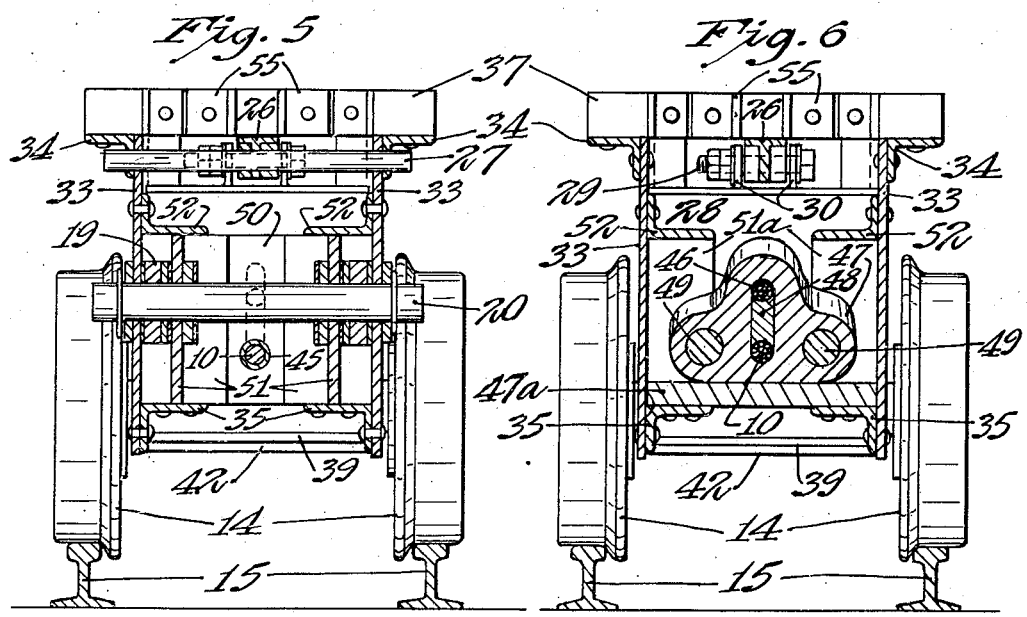
Inventor
Gust Weggum
By John E. Stryker Jr.
Attorney Patented June 15, 1948

2,443,546

UNITED STATES PATENT OFFICE 2,443,546

TRUCK HOIST CAR

Gust Weggum, Nashwauk, Minn., assignor to Butler Brothers, St. Paul, Minn., a corporation of Minnesota Application April 16, 1945, Serial No. 588,483

11 Claims. (Cl. 104—176)

This invention relates to improved mechanism for transmitting power from a car to a loaded truck or other vehicle to be propelled thereby, the device being particularly adapted to connect a small cable drawn car to a truck where the latter is used to transport loads up steep inclines.

It has been found to be economical to transport minerals and other loads in trucks up grades ranging from 10% to 30% where a suitable ramp is provided and where the power required to supplement that of the truck motor is supplied from a hoist operating a cable which is connected to the truck through the medium of a small car running on rails. The heavier steel cables ranging from one inch to two inches in diameter are often required for this work and they are particularly difficult to handle and to couple directly to the trucks. The present device eliminates all manual work in making safe, secure cable connections with the trucks.

With equipment of this kind the rails are of narrower gauge than the truck wheels so that the latter straddle the rails in moving up the ramp. Near the lower end of the incline and between the spaced ramp members a pit is provided of sufficient depth to receive the car and allow the trucks to pass over it when it is positioned in the pit. The cable extends from the hoist, usually located near the top of the incline, down the incline, between the rails, beneath the truck and its lower end is fastened to the car. In operation, when a truck is to be drawn up the incline it is driven upon the lower end of the inclined ramp and then the push car is drawn up from the pit to a position in engagement with the rear bumper or like member connected to the truck frame. Then, by operating the hoist cable, the car and truck in engagement therewith are drawn up the incline. Finally, the car is returned to the pit ready to repeat the cycle of operation with another truck.

During the travel up the incline the truck moves both vertically and laterally relative to the car because of irregularities in the supporting ramp and rail surfaces and variations in the steering of the truck which cause it to depart from a path which is in exact parallelism with the rails. This relative movement between the car and truck has lead to difficulties in transmitting the power with certainty and safety to the truck and in a manner which will prevent derailment of the car under all operating conditions.

It is an object of this invention to overcome these difficulties by providing novel and reliable means for transmitting power from a car of the class described to the trucks or other vehicles to be propelled.

Other objects will appear and be more fully pointed out in the following specification and claims.

In the accompanying drawings which illustrate, by way of example, a preferred form of my invention:

Figure 1 is a vertical section taken approximately along the center line of my improved car and also showing diagrammatically a portion of a truck in operative relation to the car;

Fig. 2 is a plan view of the car;

Fig. 3 is a front end view of the same, together with the supporting rails;

Fig. 4 is a rear end view of the same, and

Figs. 5 and 6 are vertical sections taken respectively on the lines 5—5 and 6—6 of Fig. 2.

Referring to Fig. 1 of the drawings the numeral 7 indicates the horizontally extending bumper of a truck, the frame of which is indicated at 8 and one of the rear wheels by the numeral 9. The present invention is adapted to transmit propelling force from a heavy power actuated cable indicated at 10 to the bumper 7 or other suitable thrust transmitting member carried by the vehicle. A roller 11 is formed with an annularly grooved periphery 12 adapted to make rolling contact with the bumper 7 and a pair of flanges 13 having substantially conical inner surfaces for guiding the bumper to its seat in the grooved periphery 12. This roller is supported on members which are movable to various elevations on the car which has flanged wheels 14 running on rails 15.

To revolubly support the roller 11 I provide a large pin 16 extending between supporting plates 17 and 18 located respectively above and below the roller. These plates are rigidly connected to the forward and upper ends of a pair of parallel arms 19 which are connected to the frame of the car by means of a pivot pin 20 extending horizontally so that the arms are free to oscillate together in vertical planes and within the limits determined by the maximum vibration of the bumper 7.

In order to support the roller 11 at the normal elevation of the bumper 7, I provide mechanism for balancing the arms 19 in a predetermined inclined position which is intermediate the extreme uppermost and lowermost positions of these arms. As best shown in Figs. 1, 2 and 3, this mechanism includes an angle bar 21 rigidly connecting the arms near the roller 11 and supported on a bar 22 connecting a pair of rods 23 extending generally upward and having threaded upper end portions fastened to a cross bar 24. A seat for the bar 24 is formed in a bracket 25 which is fastened to an end of a lever 26 of T-shape in cross section. The fulcrum of this lever comprises a pin 27 (Figs. 1, 2 and 5). Extending rearwardly from the fulcrum pin 27, the lever 26 has pivotally joined to its rear end portion a weight 28. The connection with the weight comprises a bolt 29 (Figs. 1, 2 and 6) fitting in perforations in the lever and in a pair of flanges 30 extending upward from the weight. When in its normal depressed position the weight 28 is supported on a floor plate 31 mounted on the car frame. Threaded lock nuts connect the rods 23 to the cross bar 24 and these may be adjusted along the rods to normally support the roller 11 at the desired height. By such means the weight 28, through its connection with the pulley 11 is caused to support the latter in its full line position shown in the drawings which corresponds to the normal elevation of the bumper 7.

In operation, as the bumper 7 oscillates substantially vertically from its normal position relative to the car, the pulley 11 moves freely in secure engagement with the bumper. As shown, the roller may oscillate from an elevated position indicated by the numeral 11a to any lower position to and including the position indicated by the numeral 11b. When the pulley is forced downward from its normal intermediate position the weight 28 is raised through the connections with the pulley including the lever 26, bracket 25, rods 23, bars 22 and 21, arms 19 and plates 17 and 18. The weight does not move, however, when the roller is moved upward from the normal position since the bar 21 is free to move upward from the bar 22 and is provided with apertures 32 (Fig. 2) through which the rods 23 pass freely.

The principal frame members of the car comprise side plates 33 provided with upper edge reinforcing bars 34, lower edge reinforcing bars 35 and a series of cross frame members 36, 37, 38, 39, 40, 41 and 42. Axles for the front and rear wheels are indicated at 43 and 44 respectively.

The cable 10 passes through a tubular guide 45 fixed on the car frame and is bent to form a loop 46 which is confined in a suitable aperture in a heavy anchor block 47. The cable fastening includes a wedge member 48 fitting within the loop 46 and apertures in the block 47 and arranged to securely grip the cable when tension is applied thereto. The block 47 is removably mounted on large studs 49 (Figs. 2 and 6) having bearings in the block and projecting to the rear from a substantially vertical plate 50 extending across the frame of the car. To confine the block 47 and plate 50, pairs of vertically disposed angle bars 51 and 51a are mounted on the side plates 33 of the car and a pair of horizontally extending bars 52 are removably mounted on the side plates above to prevent upward movement of the plate 50 and block. The heavy angle bars 51 afford a strong direct connection between the pin 20 engaging the arms 19 and the plate 50 carrying the cable anchor block 47. As shown in Fig. 1, the cable 10 is passed through openings in the plate 50 and an end of the guide tube 45 is fastened to this plate. The block 47 rests on a floor member 47a which is fastened to the frame members 35.

Connected to the rear end of the car frame is a relatively light cable 53 adapted for use in returning the car to the lower end of the incline or track. To provide for taking up slack in this cable it is connected to a drum 54 mounted on the car. This drum is normally held against rotation and is supported on spaced vertical frame members 55 and an axle 56 (Figs. 2 and 4).

In operation, the cable 10 is extended from the hoist or other suitable power-driven winding mechanism along the road bed, between the rails 15, so that it passes beneath the truck to be propelled and is anchored to my improved car as hereinbefore described. To propel the truck, this car is merely actuated to engage the truck bumper 7 with the roller 11 and then, by operation of the cable 10, the load is moved up or along the ramp by power transmitted to the truck through the cable and connections including the roller 11. Throughout this operation the arms 19 supporting the roller 11 extend obliquely upward from their pivot pin 20 to the bumper so that the reactive force exerted by the truck on the car has a downward component which holds the car on its supporting rails. Thus the power is applied efficiently to and from the cable anchor block. The bumper 7 fits in the peripheral groove 12 of the roller and as the truck, due to irregularities in steering, moves laterally relative to the car the roller merely turns on its supporting pin 16 and remains in rolling contact with the bumper. When irregularities in the road bed and/or ramp cause the bumper to vibrate with a vertical component of movement relative to the car, the roller 11 merely moves with the bumper while the supporting arms 19 oscillate vertically about the axis of pin 20. The effect of forcing the pulley to oscillate in an arc below the full line position shown is to oscillate the weight 28 through its connections with the pulley hereinbefore described. This prevents the downwardly directed force at the front end of the car from raising the rear wheels from the track or otherwise causing a derailment. The weight of the cable 10 is ordinarily such that a substantial amount of work is required to return it along the ground to the foot of the incline. With the present device the return of the car and cable to the foot of the incline is facilitated by the use of the relatively light cable 53 connected to the car and operated by power-driven mechanism.

It will be evident that a spring may be substituted for the weight 28, but I prefer the weight because of the importance of loading the car sufficiently to retain it securely on the track during its return to the foot of the grade under the drag of the heavy cable 10 as well as during its operation in transmitting power to a truck or other vehicle. The term "bumper" as used herein is intended to include not only the bars ordinarily provided for protecting the vehicles from damage at the front or rear, but also special and reinforced bumpers and equivalent members having adequate strength to transmit the lifting and propelling force of the cables to the vehicles.

Having described my invention, what I claim as new and desire to protect by Letters Patent is:

1. In a car adapted to propel a vehicle having a substantially horizontally extending bumper the improvements which comprise, a roller supporting member carried by said car and freely movable to various elevations thereon and a roller carried by said support and having a periphery disposed to make rolling contact with said bumper for transmitting propelling force thereto, the peripheral surface of said roller being adapted to maintain propelling force transmitting contact with the bumper during the application of propelling force thereto.

2. In a car adapted to propel a vehicle having a substantially horizontally extending bumper the improvements which comprise, a roller supporting member carried by said car and freely movable to various elevations thereon, a roller carried by said arm and having a periphery adapted to make rolling contact with said bumper for transmitting propelling force thereto and means for yieldingly supporting said supporting member to position said roller with its periphery at the normal elevation of said bumper, the peripheral surface of said roller being adapted to maintain propelling force transmitting contact with the bumper during the application of propelling force thereto.

3. In a car adapted to propel a vehicle having a substantially horizontally extending bumper, the improvements which comprise, an arm pivoted to oscillate freely in a vertical plane on said car and extending upward and forward thereon and a roller mounted on the forward end of said arm and having a periphery disposed to make rolling contact with said bumper for transmitting propelling force thereto, the peripheral surface of said roller being adapted to maintain propelling force transmitting contact with the bumper during the application of propelling force thereto.

4. In a car adapted to propel a vehicle having a substantially horizontally extending bumper, the improvements which comprise, an arm having a pivotal connection with said car permitting free oscillating movement in a vertical plane relative to the car, said arm extending obliquely upward and forward from said pivotal connection and a roller mounted on the front end of said arm and having an annularly grooved periphery disposed to make rolling contact with said bumper for transmitting propelling force thereto.

5. In a car for propelling a vehicle having a substantially horizontally extending bumper, the improvements which comprise, a substantially horizontally extending pin mounted on said car, an arm supported on said pin to oscillate freely in a vertical plane and projecting forward from said pin and a roller mounted on the forward end of said arm, said roller having its axis of revolution disposed tangentially to its arc of movement about the axis of said pin and being formed with an annularly grooved periphery disposed to make rolling contact with said bumper for transmitting propelling force thereto.

6. In a car adapted to propel a vehicle having a substantially horizontally extending bumper, the improvements which comprise, an arm having a pivotal connection with said car permitting free oscillating movement in a vertical plane relative to the car, said arm extending upward and forward from said pivotal connection, a roller mounted on the forward end of said arm and having an annularly grooved periphery disposed to make rolling contact with said bumper for transmitting propelling force thereto and means for yieldingly supporting said arm in a predetermined position such that the periphery of said roller is positioned at the normal elevation of said bumper.

7. In a car adapted to propel a vehicle having a substantially horizontally extending bumper the improvements which comprise, an arm supported to oscillate freely through a limited arc in a vertical plane on said car and extending upward and forward thereon, a roller mounted on the forward end of said arm and having a periphery adapted to make rolling contact with said bumper for transmitting propelling force thereto and means for yieldingly supporting said arm in an operative position intermediate the upper and lower limits of its movement, the peripheral surface of said roller being adapted to maintain propelling force transmitting contact with the bumper during the application of propelling force thereto.

8. In a car adapted to propel a vehicle having a substantially horizontally extending bumper the improvements which comprise, an arm supported to oscillate freely in a vertical plane on said car and extending upward and forward thereon, a roller mounted on the forward end of said arm and having a periphery adapted to make rolling contact with said bumper and means for yieldingly supporting said arm in a predetermined operative position intermediate the limits of its movement comprising, a weight and members connecting said weight to said arm, said members being disposed to raise said weight when said arm is depressed from said predetermined position, the peripheral surface of said roller being adapted to maintain propelling force transmitting contact with the bumper during the application of propelling force thereto.

9. In a car adapted to propel a vehicle having a substantially horizontally extending bumper the improvements which comprise, an arm having a pivotal connection with said car permitting free oscillating movement in a vertical plane, a roller mounted on the free end of said arm and having a periphery disposed to make rolling contact with said bumper, a lever pivotally supported on said car to oscillate in a vertical plane, means operatively connecting said lever to said arm and means for yieldingly supporting said lever to normally retain the periphery of said roller at the normal elevation of said bumper, the peripheral surface of said roller being adapted to maintain propelling force transmitting contact with the bumper during the application of propelling force thereto.

10. In a car adapted to propel a vehicle having a substantially horizontally extending bumper the improvements which comprise, a roller support movable freely on said car to various elevations, a roller mounted on said support and having an annularly grooved periphery adapted to make rolling contact with said bumper, a lever pivotally supported on said car to oscillate in a vertical plane, means operatively connecting said lever to said roller support and means connected to said lever for yieldingly supporting said lever and roller support to position the periphery of said roller at the normal elevation of said bumper.

11. In a car adapted to propel a vehicle having a substantially horizontally extending bumper the improvements which comprise, a roller support movable freely on said car to various elevations, a roller mounted on said support and having a periphery adapted to make rolling contact with said bumper, a lever pivotally supported on said car to oscillate in a vertical plane, means operatively connecting said lever to said arm and a counterweight connected to said lever for yieldingly supporting said lever and the roller support to position the periphery of said roller at the normal elevation of said bumper, said counterweight having a fixed support on said car from which it is raised when said pulley is forced down from said normal elevation by downward movement of the vehicle bumper relative to the car.

GUST WEGGUM.

REFERENCES CITED

The following references are of record in the file of this patent:

UNITED STATES PATENTS

| Number | Name | Date |
|---|---|---|
| 1,586,783 | Coffey | June 1, 1926 |